May 21, 1935.  A. M. WILSON  2,002,382

SINGLE PHASE MOTOR

Filed April 6, 1934

INVENTOR.
Alexander M. Wilson,
BY Arthur H. Ewald,
ATTORNEY.

Patented May 21, 1935

2,002,382

UNITED STATES PATENT OFFICE 2,002,382

SINGLE PHASE MOTOR

Alexander M. Wilson, Cincinnati, Ohio

Application April 6, 1934, Serial No. 719,354

3 Claims. (Cl. 172—278)

The present invention relates to single phase induction motors.

The principal object of the present invention is to provide a motor of the type mentioned wherein the heat losses are minimized and the starting torque and efficiency of the motor greatly increased over motors of this type presently in use.

In motors of the single phase induction type as presently used particularly in such devices as electric fans, the field consists of a magnetic path around a part of which shading rings are used to split the phase and give the necessary starting torque. These motors have comparatively low torque, heat excessively during operation and are of low efficiency.

The present invention consists in providing an auxiliary magnetic pole or poles in combination with a primary magnetic pole or poles and novel means for interlinking the magnetic paths for producing the required rotating field in such manner that the efficiency and performance of the motor are greatly improved. Where shading rings are used on the primary poles, they are extended so as physically to embrace all or a part of the auxiliary pole or poles.

Figure 1:
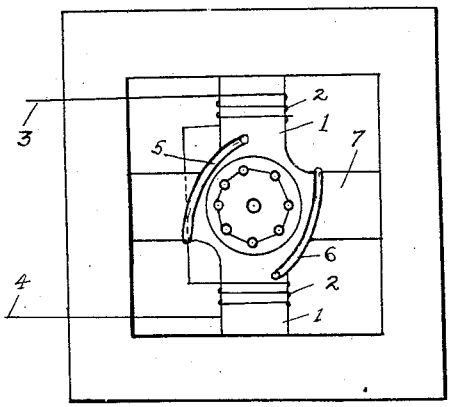
Figure 1 is a diagram of one form of a motor constructed in accordance with this invention.

Referring to Figure 1, my new motor consists of the primary magnetic poles 1 provided with windings 2 receiving current through the line leads 3 and 4. The poles 1 are arranged to receive shading rings 5 and 6. These shading rings in the motors presently in use embrace only a portion of the magnetic path 1.

In my improved motor I provide auxiliary magnetic poles 7 which are embraced by the shading rings 5 and 6 as clearly shown in Figure 1. It will, of course, be obvious that instead of physically embracing all of magnetic path 7, they may interlink with only a part of the poles 7.

Figure 3:
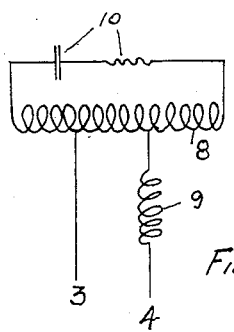
Figure 3 is a diagram of the circuit of the motor as illustrated in Figure 2.
Figure 2:
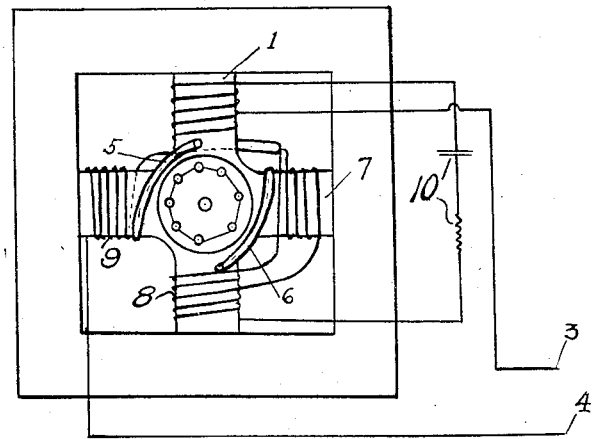
Figure 2 is a diagram of a motor also constructed in accordance with this invention in which a transformer effect is produced in one of the windings.

In the form illustrated in Figure 2, both the poles 1 and 7 are provided with windings, said windings being illustrated diagrammatically in Figure 3. As shown the winding 8 on poles 1 is an autotransformer, the winding 9 on poles 7 being in series with the primary of said transformer. An impedance or impedances 10, which may consist of inductance, capacity, resistance or any combination thereof, is provided across the secondary of the transformer. It will thus be apparent that in order to reverse rotation of the motor it is only necessary to reverse the terminals of winding 9.

The motor as illustrated in Figures 2 and 3 may also be provided with shading rings physically embracing both primary and secondary poles in the same manner as the motor illustrated in Figure 1.

From the foregoing description, the nature of my invention will be apparent to those skilled in the art to which the same appertains.

It will be obvious, of course, that various modifications may be made in the motor as illustrated and described without departing from the spirit and scope of the present invention as defined in the appended claims.

Having thus fully described my invention, what I claim as new and desire to secure by Letters Patent is:

1. A motor of the type mentioned comprising in combination with a primary magnetic pole piece, a shading ring on said pole piece, an auxiliary magnetic pole piece, said shading ring being extended so as to embrace all or a portion of the auxiliary magnetic pole piece.

2. A motor of the type mentioned comprising in combination with primary magnetic pole pieces, auxiliary magnetic pole pieces, a transformer on one set of said pole pieces, an impedance across the secondary of said transformer, and a coil on the other set of pole pieces in series in the primary circuit of said transformer.

3. A motor of the type mentioned comprising in combination with primary magnetic pole pieces, auxiliary magnetic pole pieces, a transformer on one set of said pole pieces, an impedance across the secondary of said transformer, a coil on the other set of pole pieces in series with the primary of said transformer, shading rings on one set of said pole pieces, each of said shading rings being extended so as to embrace all or a portion of one of the other set of pole pieces.

ALEXANDER M. WILSON.